E. B. PARKHURST.
LOBSTER CRUSHER.
APPLICATION FILED SEPT. 2, 1915.
1,219,857.
Patented Mar. 20, 1917.
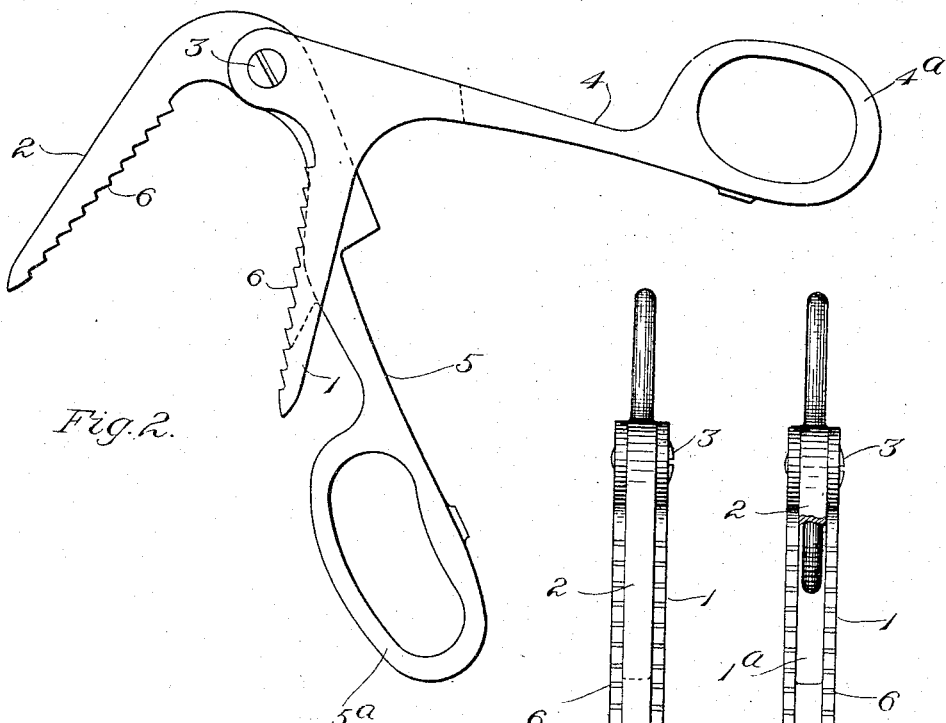
Fig. 1.
Fig. 2.
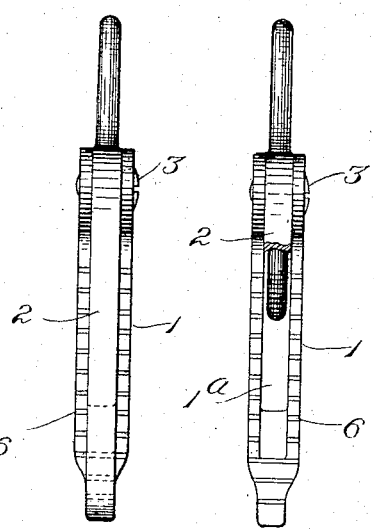
Fig. 3.   Fig. 4.
Witness:
Oscar F Hill
Inventor:
Edward B. Parkhurst
by Chas. F. Randall
Attorney.

UNITED STATES PATENT OFFICE.

EDWARD B. PARKHURST, OF WOBURN, MASSACHUSETTS.

LOBSTER-CRUSHER.

1,219,857.  Specification of Letters Patent.  Patented Mar. 20, 1917.

Application filed September 2, 1915. Serial No. 48,699.

*To all whom it may concern:*

Be it known that I, EDWARD B. PARKHURST, a citizen of the United States, residing at Woburn, in the county of Middlesex, State of Massachusetts, have invented a certain new and useful Improvement in Lobster-Crushers, of which the following is a specification, reference being had therein to the accompanying drawings.

An embodiment of the invention is shown in the drawings, in which latter,—

Figure 1 is a side elevation of the said embodiment, in closed condition.

Fig. 2 is a side elevation thereof in open condition.

Fig. 3 is an end elevation.

Fig. 4 is an end elevation with one of the jaws partly broken away.

My invention consists in an implement of novel construction and character which has been designed with especial reference to employment for the purposes of crushing the shells of the claws, etc., of lobsters in order to render the meat thereof accessible, and of extracting the meat from within such shells. The implement is designed especially for table use. It comprises, essentially, a pair of jaws, 1, 2, which are joined pivotally together at 3 and provided with operating handles 4, 4. The form of the jaws is such that adjacent the pivot 3 their root-portions are spaced quite widely apart, as shown in Figs. 1 and 2, although in the closed condition of the implement represented in Fig. 1, the opposing faces of the jaws converge toward their reduced extremities, and such extremities come together and meet. The acting faces of the jaws are provided with holding serrations 6, 6, etc., to provide a secure grasp upon the claw or the like which is grasped between them. In a partially-opened condition of the implement, the said acting faces are parallel. In the fully-opened condition of the implement as represented in Fig. 2, the extremities of the jaws spread apart from each other to an extent sufficient to admit between the jaws the largest sized portion of shell likely to be encountered in use, although in this condition the shape of the root-portions of the jaws and the normal extent of their separation are such that the acting faces still form a comparatively slight angle with each other, so that the claw or the like entered between the jaws is not likely to be deflected outward from between the jaws in the closing operation. The handles are provided with loops 4ª, 5ª, to receive respectively the thumb and one or two fingers of one hand of the user of the implement. The jaws stand at an angle with respect to the direction of the handles, as represented in Figs. 1 and 2, so as to facilitate the use of the implement when held by one hand, upon a claw or the like held by the other hand. This angular relationship facilitates the use of the implement in picking up a portion lying upon a dish or table and placing it where needed, without necessitating the use of one's fingers or any additional implement such as a fork or spoon, enabling the operation to be performed with the employment of one hand only. As shown by Figs. 3 and 4, the jaws are narrow, especially at the tip, and are also slender or narrow otherwise to facilitate the introduction of the same lengthwise in a partially open condition into the hollow of a claw, or into some other portion of the shell of a lobster, for the purpose of grasping and extracting portions of meat contained therein. A special feature of the implement is the slotting of one of the jaws in the direction of its length, as at 1ª, Fig. 4, in the case of jaw 1, from the hinge or pivot outward, leaving two narrow serrated or toothed longitudinal portions at opposite sides of the slot, the opposing jaw (2) being narrower and corresponding in width substantially with the slot, so that the object grasped between the two jaws is engaged at three points, viz:—a single point at one side of the object, located intermediately with respect to two points at the other side thereof, whereby the crushing and gripping function is promoted and facilitated. In the wide-open condition of the implement, Fig. 2, the slot 1ª accommodates a part of the handle-portion of the opposing jaw at the handle-side of the pivot. The serrations are formed with oblique surfaces facing toward the free extremities of the jaws, and with abrupt shoulders facing toward the pivot. Thereby the effectiveness of the said serrations in holding the object which is grasped between the two jaws, and in preventing the object from being forced out from between the jaws as they close together, is very much increased. The engagement of the jaws with the object is practically positive so that the jaws hold very securely. The implement will grasp and operate effectively objects of varying sizes. It is not limited necessarily to use in connection with lobsters.

I claim as my invention:—

1. The improved lobster-crusher comprising a pair of crushing jaws, pivotally joined together and provided with operating handles, the said jaws standing at an angle to the said handles in a plane or planes parallel with that in which the handles work, with the root-portions of the jaws spaced widely apart and the jaws converging to and meeting at their extremities in their closed condition.

2. The improved lobster-crusher comprising a pair of narrow or slender crushing jaws adapted to be inserted into the hollow of a lobster-claw, or the like, and operating handles, the said jaws standing at an angle to the said handles in a plane or planes parallel with that in which the handles work, with the root-portions of the jaws spaced widely apart and the jaws converging to and meeting at their extremities in their closed condition.

3. The improved lobster-crusher comprising a pair of crushing jaws, pivotally joined together and provided with operating handles, the said jaws standing at an angle to the said handles, with the root-portions of the jaws spaced widely apart and the jaws converging to and meeting at their extremities in their closed condition, and with one of the jaws composed of separated engaging portions alternating in position with the engaging portion of the opposing jaw.

4. The improved lobster-crusher comprising a pair of narrow or slender crushing jaws adapted to be inserted into the hollow of a lobster-claw, or the like, and operating handles, the said jaws standing at an angle to the said handles, with the root-portions of the jaws spaced widely apart and the jaws converging to and meeting at their extremities in their closed condition, and with one of the jaws composed of separated engaging portions alternating in position with the engaging portion of the opposing jaw.

In testimony whereof I affix my signature in presence of two witnesses.

EDWARD B. PARKHURST.

Witnesses:
ELLEN O. SPRING,
ELSIE A. BARTZSCH.

Copies of this patent may be obtained for five cents each, by addressing the "Commissioner of Patents, Washington, D. C."